United States Patent
Yano et al.

(10) Patent No.: US 8,022,136 B2
(45) Date of Patent: Sep. 20, 2011

(54) VULCANIZED RUBBER COMPOSITION, PNEUMATIC TIRE AND THE PROCESS OF PRODUCING THE SAME

(75) Inventors: Hiroyuki Yano, Uji (JP); Yukio Isobe, Kobe (JP); Naoya Ichikawa, Kobe (JP); Takayuki Hattori, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 143 days.

(21) Appl. No.: 12/516,474

(22) PCT Filed: Sep. 4, 2008

(86) PCT No.: PCT/JP2008/065931
§ 371 (c)(1),
(2), (4) Date: May 27, 2009

(87) PCT Pub. No.: WO2009/034902
PCT Pub. Date: Mar. 19, 2009

(65) Prior Publication Data
US 2010/0076118 A1    Mar. 25, 2010

(30) Foreign Application Priority Data

Sep. 10, 2007 (JP) .................. 2007-234080
Sep. 2, 2008 (JP) .................. 2008-224908

(51) Int. Cl.
*C08L 47/00* (2006.01)
*B60C 9/12* (2006.01)

(52) U.S. Cl. .............. 524/571; 524/13; 536/56; 536/95

(58) Field of Classification Search .................. 524/571, 524/13; 536/56, 84, 95
See application file for complete search history.

(56) References Cited

U.S. PATENT DOCUMENTS

| | | |
|---|---|---|
| 2,486,720 A | 11/1949 | Perkerson |
| 2,650,891 A | 9/1953 | Buckwalter |
| 3,709,845 A | 1/1973 | Boustany et al. |
| 4,508,860 A | 4/1985 | Hawes |
| 5,290,830 A | 3/1994 | Tung et al. |
| 6,117,545 A * | 9/2000 | Cavaille et al. .............. 428/357 |
| 6,703,497 B1 * | 3/2004 | Ladouce et al. .............. 536/56 |
| 2003/0083516 A1 | 5/2003 | Korth et al. |
| 2007/0197688 A1 | 8/2007 | Tsukada et al. |
| 2007/0241480 A1 | 10/2007 | Kanenari et al. |

FOREIGN PATENT DOCUMENTS

| | | |
|---|---|---|
| CZ | 237729 B1 | 10/1985 |
| EP | 1650253 A1 | 4/2006 |
| JP | 5-301994 A | 11/1993 |
| JP | 11-78437 A | 3/1999 |
| JP | 11-513425 A | 11/1999 |
| JP | 2000-95898 A | 4/2000 |
| JP | 2002-503621 A | 2/2002 |
| JP | 2002-155164 A | 5/2002 |
| JP | 2002-524618 A | 8/2002 |
| JP | 2003-64221 A | 3/2003 |
| JP | 2005-75856 A | 3/2005 |
| JP | 2005-133025 * | 5/2005 |
| JP | 2005-133025 A | 5/2005 |
| JP | 2006-36926 A | 2/2006 |
| JP | 2006-206837 A | 8/2006 |
| JP | 2006-206864 A | 8/2006 |
| WO | WO-2005/092971 A1 | 10/2005 |

OTHER PUBLICATIONS

European Search Report dated Aug. 27, 2010 for Application No. 08830800.2.

* cited by examiner

*Primary Examiner* — Ling Choi
(74) *Attorney, Agent, or Firm* — Birch, Stewart, Kolasch & Birch, LLP

(57) ABSTRACT

By using a vulcanized rubber composition containing a rubber component composed of at least any one of a natural rubber, a modified natural rubber and a synthetic rubber, and chemically modified microfibril cellulose, it is possible to provide a vulcanized rubber composition that is environmentally conscious and that exhibits excellent rupture characteristics and a low energy loss, and a pneumatic tire that is excellent in rolling resistance property, steering stability and durability.

17 Claims, 1 Drawing Sheet

VULCANIZED RUBBER COMPOSITION, PNEUMATIC TIRE AND THE PROCESS OF PRODUCING THE SAME

TECHNICAL FIELD

The present invention relates to an environmentally conscious vulcanized rubber composition and a pneumatic tire produced by using the same.

BACKGROUND ART

Heretofore, there have been known technologies of improving the hardness and the modulus of a rubber by reinforcing the rubber with staple fibers such as aramid and cellulose, or with a crystalline polymer such as syndiotactic polybutadiene, thereby increasing the complex modulus (E*) at for example 70° C. to improve steering stability (see, for example, Japanese Patent Laying-Open No. 2005-133025 (patent document 1)).

Japanese Patent Laying-Open No. 2005-133025 (patent document 1) proposes a rubber composition composed of a diene-based rubber component, starch and cellulose for the purpose of providing a rubber composition excellent in abrasion resistance. It also proposes to use bacterial cellulose as the cellulose. However, the technologies of patent document 1 are problematic in poor rupture characteristics and large energy loss at the interface between a rubber and cellulose because of poor compatibility of the rubber and the cellulose.

Japanese Patent Laying-Open No. 2005-075856 (patent document 2) discloses a rubber composition prepared by incorporating a fine powdery cellulose fiber prepared from natural vegetable fiber into a diene-based rubber as a rubber composition that can exert low repellency and rigidity (steering stability) simultaneously. However, the technology of patent document 2 has some room for improvement for obtaining rigidity and reinforcing property suitable for the incorporated amount of cellulose fibers for reasons of being short of fiber length of a cellulose fiber in a production method.

Therefore, it is still difficult to obtain a vulcanized rubber composition that is environmentally conscious and excellent in rupture characteristics and that causes less energy loss.
Patent document 1: Japanese Patent Laying-Open No. 2005-133025
Patent document 2: Japanese Patent Laying-Open No. 2005-075856

DISCLOSURE OF THE INVENTION

Problems to be Solved by the Invention

The present invention intends to solve the above problems to provide a vulcanized rubber composition that is environmentally conscious and that has both excellent rupture characteristics and a low energy loss, and a pneumatic tire produced by using the vulcanized rubber composition that is environmentally conscious and that is excellent in rolling resistance property, steering stability and durability.

Means for Solving the Problems

The present invention provides a vulcanized rubber composition including a rubber component composed of at least any one of a natural rubber, a modified natural rubber and a synthetic rubber and chemically modified microfibril cellulose.

In the vulcanized rubber composition of the present invention, as an example of the chemical modification for the chemically modified microfibril cellulose may be used at least one selected from the group consisting of acetylation, alkyl esterification, complex esterification, β-ketoesterification, alkyl carbamatation and aryl carbamatation.

In the vulcanized rubber composition of the present invention, it is preferable that the chemically modified microfibril cellulose have been chemically modified to have a substitution degree within the range of 0.2 to 2.5.

In the vulcanized rubber composition of the present invention, it is preferable that the chemically modified microfibril cellulose have an average fiber diameter within the range of 4 nm to 1 µm.

In the vulcanized rubber composition of the present invention, it is preferable that the content of the chemically modified microfibril cellulose be within the range of 1 to 50 parts by mass relative to 100 parts by mass of the rubber component.

In the vulcanized rubber composition of the present invention, it is preferable that the rubber component be composed of at least either a natural rubber or a modified natural rubber.

The present invention also provides a pneumatic tire produced by using any one of the above rubber compositions.

Moreover, the present invention provides a method of producing a vulcanized rubber composition including mixing, to a rubber latex containing at least one rubber component of a natural rubber, a modified natural rubber and a synthetic rubber, 1 to 50 parts by mass, relative to 100 parts by mass of the rubber component, of chemically modified microfibril cellulose, followed by drying them to prepare a masterbatch.

In the method of producing the vulcanized rubber composition of the present invention, it is preferable that the mixing be a mixing method using a high-speed disperser.

In the method of producing the vulcanized rubber composition of the present invention, it is preferable that the drying be a drying method of any one of drying in a heating oven, air-drying and pulse drying.

In the method of producing the vulcanized rubber composition of the present invention, it is preferable that the chemical modification in the chemically modified microfibril cellulose be at least one selected from the group consisting of acetylation, alkyl esterification, complex esterification, β-ketoesterification, alkyl carbamatation and aryl carbamatation.

In the method of producing the vulcanized rubber composition of the present invention, it is preferable that the chemically modified microfibril cellulose have been chemically modified so as to have a substitution degree within the range of 0.2 to 2.5.

In the method of producing the vulcanized rubber composition of the present invention, it is preferable that the chemically modified microfibril cellulose have an average fiber diameter within the range of 4 nm to 1 µm.

The present invention also provides a method of producing a pneumatic tire including the steps of: kneading a compounding agent to a masterbatch prepared in the method of producing the vulcanized rubber composition, adding a vulcanizing agent and a vulcanization accelerator and kneading, and vulcanizing the mixture under an application of pressure and heating in a tire mold.

Effects of the Invention

According to the present invention, it becomes possible to provide a vulcanized rubber composition that is environmentally conscious and at the same time, has both excellent rupture characteristics and a low energy loss, and a pneumatic tire produced by using the vulcanized rubber composition that is environmentally conscious and that is excellent in rolling resistance property, steering stability and durability.

Figure 1:
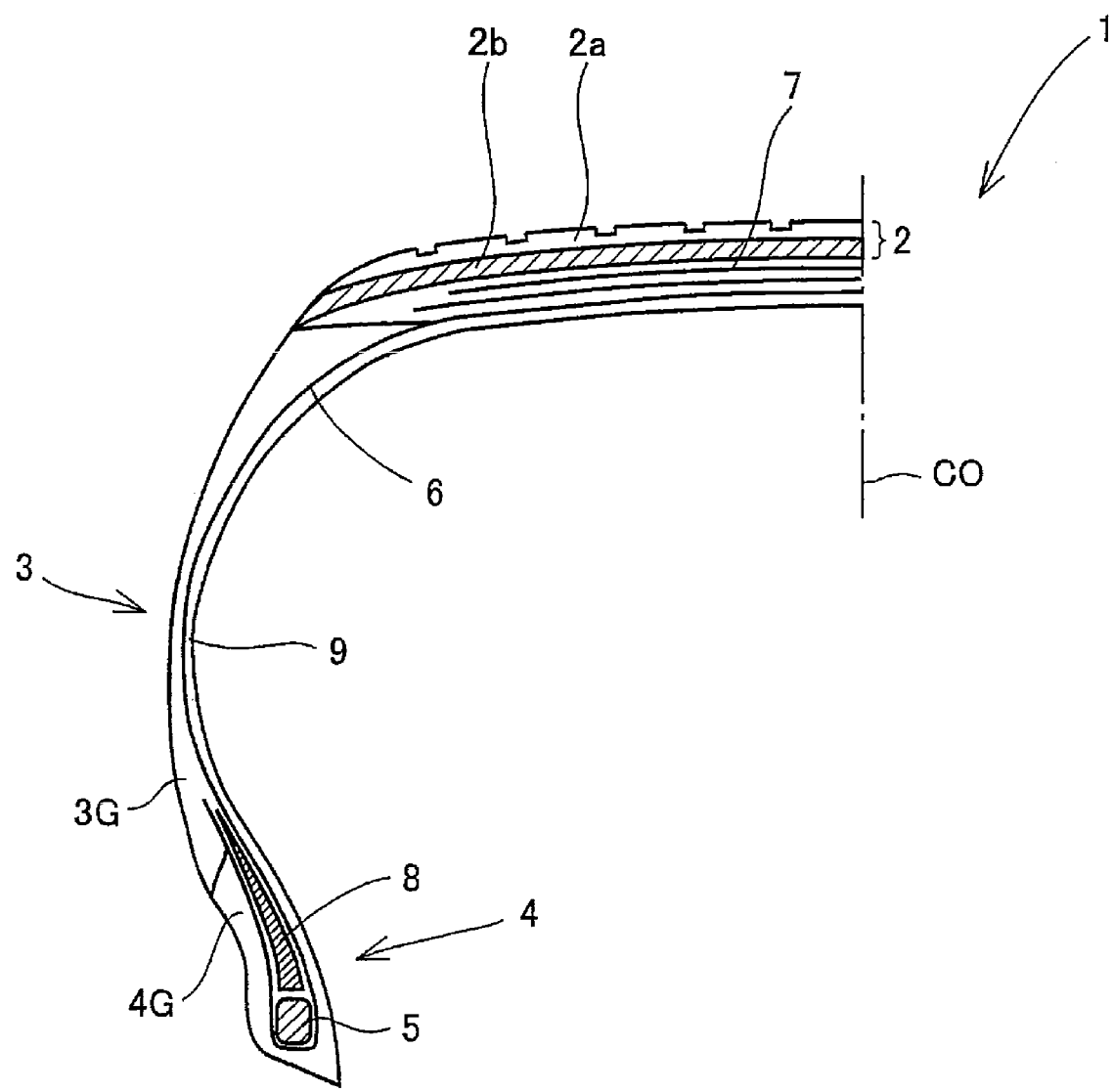
FIG. 1 is a schematic sectional view showing an example of the pneumatic tire of the present invention.

DESCRIPTION OF THE REFERENCE SIGNS 1 pneumatic tire, 2 tread portion, 3 sidewall portion, 4 bead portion, 5 bead core, 6 carcass, 7 belt layer, 8 bead apex rubber, 9 inner liner rubber, 2a cap tread, 2b base tread, 3G sidewall rubber, 4G clinch rubber.

BEST MODES FOR CARRYING OUT THE INVENTION

The vulcanized rubber composition according to the present invention contains a rubber component composed of at least one of a natural rubber, a modified natural rubber and a synthetic rubber and chemically modified microfibril cellulose. The chemically modified microfibril cellulose has an activity as a rubber reinforcing agent. In chemically modified microfibril cellulose, a desired modifying group has been introduced to microfibril cellulose. Therefore, it is possible to increase the compatibility of the chemically modified microfibril cellulose with a rubber due to, for example, interaction or direct bonding between the modifying group and the rubber. Therefore, in the vulcanized rubber composition of the present invention, little energy is lost in an interface between the chemically modified microfibril cellulose and the rubber, so that the dispersibility of the chemically modified microfibril cellulose in the rubber composition is good. Thereby, a rubber excellent in rupture characteristics, more typically, in tensile strength and breaking elongation can be obtained from the vulcanized rubber composition of the present invention. In addition, the vulcanized rubber composition of the present invention has a good E* (complex modulus) without a significant increase in tan δ (loss tangent) at, for example, about 70° C. Therefore, in an occasion of using the vulcanized rubber composition of the present invention for a pneumatic tire for example, it is possible to highly establish the rolling resistance property, the steering stability and the durability of the pneumatic tire.

<Chemically Modified Microfibril Cellulose>

The chemically modified microfibril cellulose used in the present invention is a product obtained by chemically modifying microfibril cellulose originating in at least any one selected from natural products such as wood, bamboo, hemp, jute, kenaf, agricultural waste, cloth, regenerated pulp, used paper, bacterial cellulose, and ascidian cellulose. Here, in the present invention, microfibril cellulose typically means a cellulose fiber having an average fiber diameter within the range of 4 nm to 1 μm, and more typically means a cellulose fiber having a minute structure having an average fiber diameter of up to 100 nm that is composed of aggregates of cellulose molecules. Here, typical microfibril cellulose may be formed in the form of an aggregate of cellulose fibers having an average fiber diameter as that mentioned above.

In the present invention, use of chemically modified microfibril cellulose originating in a natural product as those mentioned above makes it possible to obtain a remarkable effect on reduction in $CO_2$ emission, which renders the vulcanized rubber composition of the present invention environmentally conscious. Among them, the chemically modified microfibril cellulose is particularly preferably a product obtained by chemically modifying microfibril cellulose originating in at least any one selected from wood, bamboo, hemp, jute, kenaf, agricultural waste, cloth, regenerated pulp and used paper because it exhibits good $CO_2$ emission reduction effect and it is easy to obtain.

Examples of an aspect of the chemical modification of microfibril cellulose include such as esterification treatment, etherification treatment, and acetalization treatment. More specifically, preferable examples include acylation such as acetylation, cyanoethylation, amination, sulfone esterification, phosphatization, alkylation such as butylation, chlorination and the like. In particular, acetylation is cost-advantageous because of the simplicity of its reaction, and it is preferable in that it can enhance the effect of improving the compatibility of chemically modified microfibril cellulose and a rubber and in that chemicals to be used therefor are of high safety.

In addition, in the case of using amination, it is possible to further improve the dispersibility of chemically modified microfibril cellulose in a vulcanized rubber composition by using an epoxidized rubber that is highly reactive with an amino group in combination as a rubber composition and causing the amino group to react with the epoxidized rubber.

Alkyl esterification, complex esterification and β-ketoesterification, which are modifying methods involving ester linkage formation like acetylation, are achieved via simple reactions similar to acetylation, so that they are cost-advantageous. Especially, the β-ketoesterification is a technique suitable for industrialization because alkyl ketene dimer derivatives are used currently as sizing agents for cellulose.

Further, examples of an aspect of the chemical modification of microfibril cellulose also include alkyl carbamatation and aryl carbamatation. Alkyl carbamatation and aryl carbamatation can be considered as being suitable for practical use because modifiers to be used therefor are isocyanate compounds, which are of high reactivity, and cellulose-based materials modified by this method are used as column filler for optical resolution.

The chemically modified microfibril cellulose may be composed of either a single kind or a combination of two or more kinds. Examples of the aspect of the combination of two or more kinds include a combination that are different in the method of chemical modification, average fiber diameter, etc.

It is preferable that the chemically modified microfibril cellulose have been chemically modified to have a substitution degree within the range of 0.2 to 2.5. The substitution degree as referred to herein means the average number of the hydroxyl groups substituted with other functional groups through chemical modification among the hydroxyl groups of cellulose per glucose ring unit, and the theoretical maximum value thereof is 3. When the substitution degree is 0.2 or more, the effect of improving the compatibility of a rubber with the chemically modified microfibril cellulose is particularly good. When it is 2.5 or less, the chemically modified microfibril cellulose is excellent in compatibility with a rubber, and it excels in flexibility. The substitution degree is more preferably within the range of 0.3 to 2.5, and even more preferably within the range of 0.5 to 2.0.

Here, the substitution degree in the case where the chemically modified microfibril cellulose is composed of a combination of two or more kinds can be calculated as an average of the overall chemically modified microfibril cellulose.

The substitution degree in chemically modified microfibril cellulose can be determined, for example, by titration using 0.5 N—NaOH and 0.2 N—HCl, NMR, infrared absorption spectrometry, etc.

Examples of the chemically modified microfibril cellulose to be used particularly preferably in the present invention include acetylated microfibril cellulose (cellulose acetate) with a substitution degree within the range of 0.3 to 2.0. The substitution degree of the acetylated microfibril cellulose is preferably within the range of 0.5 to 1.8, and more preferably is within the range of 0.7 to 1.5. Furthermore, the substitution degree is preferably within the range of 0.3 to 1.8 when the chemically modified microfibril cellulose is alkyl esterified microfibril cellulose, within the range of 0.4 to 1.8 in the case of complexly esterified microfibril cellulose, within the range of 0.3 to 1.8 in the case of β-ketoesterified microfibril cellulose, within the range of 0.3 to 1.8 in the case of alkyl carbamated microfibril cellulose, and within the range of 0.3 to 1.8 in the case of aryl carbamated microfibril cellulose.

The chemically modified microfibril cellulose preferably has an average fiber diameter of 4 nm or more. A case where the chemically modified microfibril cellulose has an average fiber diameter is 4 nm or more is advantageous because nanofibers are less damaged at the time of modification and the surface condition is smooth and the strength can be improved after being complexed with a rubber. The average fiber diameter is more preferably 10 nm or more, and even more preferably 20 nm or more.

In addition, the chemically modified microfibril cellulose preferably has an average fiber diameter of 1 nm or less. A case where the chemically modified microfibril cellulose has an average fiber diameter is 1 μm or less is advantageous because the compatibility of a rubber and the chemically modified microfibril cellulose is particularly good, so that there is a noticeable effect of reducing the energy loss at the interface between the rubber and the chemically modified microfibril cellulose, and at the same time it is because a better reinforcing effect can be obtained due to improvement in elastic modulus, and the compatibility with a rubber can be improved by a chemically modified surface. The average fiber diameter is more preferably 0.5 μm or less, even more preferably 0.2 μm or less, and most preferably 0.1 μm or less.

Here, the average fiber diameter in the case where the chemically modified microfibril cellulose is composed of a combination of two or more kinds can be calculated as an average of the overall chemically modified microfibril cellulose.

The average fiber diameter of chemically modified microfibril cellulose may be measured, for example, by image analysis of a scanning electron microscope photograph, image analysis of a transmission electron microscope photograph, analysis of X-ray scattering data, etc.

In a vulcanized rubber composition using only microfibril cellulose having not been chemically modified as the microfibril cellulose, an energy loss is produced between the rubber and the microfibril cellulose due to poor compatibility of the rubber and the microfibril cellulose, so that it is difficult to reduce rolling resistance when the vulcanized rubber composition is used for a pneumatic tire. In the present invention, however, microfibril cellulose having not been modified may be used together with chemically modified microfibril cellulose unless the effect of the present invention is impaired because the chemically modified microfibril cellulose is used indispensably.

The content of the chemically modified microfibril cellulose is preferably within the range of 1 to 50 parts by mass relative to 100 parts by mass of the rubber component. When the content of the chemically modified microfibril cellulose is 1 part by mass or more, the reinforcing effect caused by incorporation of the chemically modified microfibril cellulose and the effect of improving elastic modulus are particularly good. A case where the content is 50 parts by mass or less is advantageous because the dispersibility of the chemically modified microfibril cellulose in the rubber hardly deteriorates. The content of the chemically modified microfibril cellulose is preferably within the range of 5 to 35 parts by mass, and more preferably within the range of 7 to 15 parts by mass.

While examples of the chemical modification include such as esterification, etherification and acetalization, acetylation, amination, sulfone esterification, phosphatization, alkyl esterification, alkyl etherification, alkyl esterification, complex esterification, β-ketoesterification, alkyl carbamatation, and aryl carbamatation, which are more specific examples of the chemical modification, may be carried out, for example, by the following method.

Acetylation can be carried out, for example, by a method including adding acetic acid, concentrated sulfuric acid and acetic anhydride to microfibril cellulose, thereby causing them to react. More specifically, it can be carried out, for example, by a conventionally known method, such as a method that includes making microfibril cellulose and acetic anhydride react together in the presence of a sulfuric acid catalyst in a mixed solvent composed of acetic acid and toluene, thereby causing an acetylation reaction, and then replacing the solvent by water.

Amination can be carried out, for example, by a method including first converting microfibril cellulose into a tosyl ester, which is then caused to react with a alkylamine in an alcohol to make a nucleophilic substitution reaction.

The sulfone esterification can be carried out, for example, by a simple operation including only dissolving cellulose in sulfuric acid and adding the solution into water, Besides, it can be also carried out by a method of sulfuric anhydride gas treatment, treatment with a combination of chlorosulphonic acid and pyridine, etc.

Phosphatization can be carried out, for example, by a method in which microfibril cellulose having been subjected to dimethylamine treatment, etc. is treated with phosphoric acid and urea.

Alkyl esterification can be carried out, for example, by a Schotten-Baumann method in which microfibril cellulose is caused to react using carboxylic acid chloride under basic conditions. Alkyl etherification can be carried out by a Willamson method in which microfibril cellulose is caused to react using an alkyl halide under basic conditions or the like. Chlorination can be carried out, for example, by a method of adding thionyl chloride in DMF (dimethylformamide), followed by heating.

Complex esterification can be carried out, for example, by a method in which two or more kinds of carboxylic acid anhydrides or carboxylic acid chlorides are caused to react with microfibril cellulose under basic conditions.

β-Ketoesterification can be carried out, for example, by a method in which a diketene or an alkyl ketene dimer is caused to react with microfibril cellulose, or a transesterification reaction between microfibril cellulose and a β-ketoester compound such as an alkyl acetoacetate.

Alkyl carbamatation can be carried out, for example, by a method in which an alkyl isocyanate is caused to react with microfibril cellulose in the presence of a basic catalyst or a tin catalyst.

Aryl carbamatation can be carried out, for example, by a method in which an aryl isocyanate is caused to react with microfibril cellulose in the presence of a basic catalyst or a tin catalyst.

<Rubber Component>

The rubber component is composed of at least any one of a natural rubber, a modified natural rubber and a synthetic rubber. As the rubber component, general rubbers used for a tire application, etc. can preferably be used. Examples of the rubber include such as a butadiene rubber, a styrene-butadiene rubber, an isoprene rubber, a natural rubber, a modified natural rubber and an acrylonitrile-butadiene rubber. In addition, examples of the modified natural rubber include such as an epoxidized natural rubber and a hydrogenaed natural rubber.

Further, it is preferable that the rubber component be composed of at least any one of a butadiene rubber, a styrene-butadiene rubber, a natural rubber, a modified natural rubber, and an acrylonitrile-butadiene rubber because it is possible to obtain a latex easily and relatively inexpensively without increasing the cost or using excessive energy, excessive solvent, or the like. Furthermore, it is preferable that the rubber component contain at least either a natural rubber or a modified natural rubber, and it is particularly preferable that the rubber component be composed of at least either a natural rubber or a modified natural rubber because it is possible to provide a rubber which provides little load to the environment, which is highly compatible with microfibril cellulose, which is excellent in fracture characteristics, and which exhibits more reduced energy loss.

It is also preferable that the rubber component be composed of at least any one of a natural rubber, a modified natural rubber with a relatively small modification amount, a butadiene rubber and a styrene-butadiene rubber with a relatively small styrene amount because it is excellent in fuel consumption saving effect due to reduction in tan δ.

When the rubber component contains at least either a natural rubber or a modified natural rubber, the combined content of the natural rubber and the modified natural rubber in the rubber component is preferably 50% by mass or more, more preferably 65% by mass or more, and even more preferably 75% by mass. When the combined content of the natural rubber and the modified natural rubber in the rubber component is adjusted to 50% by mass or more, it is possible to highly achieve both good fracture characteristics and low energy loss because the chemically modified microfibril cellulose is highly affinitive with a plant-derived natural rubber or a modified natural rubber obtainable by modifying such a plant-derived natural rubber. In addition, the higher the combined content of the natural rubber and the modified natural rubber is set, the more advantageous it is with respect to improvement in tensile strength because a natural rubber and a modified natural rubber have good tensile strength due to their elongation crystallinity. Furthermore, the higher the combined content of the natural rubber and the modified natural rubber is set, the more the effect of reducing $CO_2$ emission can be improved.

Here, when a modified natural rubber is used, it is particularly preferable that the modified natural rubber be an epoxidized natural rubber because it is possible to achieve a high compatibility with microfibril cellulose and with chemically modified microfibril cellulose and it is easy to reduce load to the environment and secure rubber properties simultaneously.

As the epoxidized natural rubber, a commercially available product or a product obtained by epoxidizing a natural rubber (NR) may be used. A method for epoxidizing a natural rubber is not particularly limited and examples thereof include such as a chlorohydrin method, a direct oxidation method, a hydrogen peroxide method, an alkylhydroperoxide method, and a peracid method. As the peracid method, a method of, for example, causing an organic peracid, such as peracetic acid and performic acid, as an epoxidizing agent to react with an emulsion of natural rubber.

The epoxidation ratio of the epoxidized natural rubber is preferably 2.5% by mol or more, more preferably 7.5% by mol or more, and even more preferably 15% by mol or more. Here, the epoxidation ratio means the ratio of the number of the double bonds epoxidized to the number of all the double bonds in a natural rubber before epoxidation and it can be determined by, for example, titrimetric analysis, nuclear magnetic resonance (NMR) analysis, etc. When the epoxidation ratio of the epoxidized natural rubber is 2.5% by mol or more, it is possible to improve the compatibility of the rubber with microfibril cellulose and chemically modified microfibril cellulose through an interaction or a chemical bond of an epoxy group with the microfibril cellulose and the chemically modified microfibril cellulose.

In addition, the epoxidation ratio of the epoxidized natural rubber is preferably 60% by mol or less, and more preferably 30% by mol or less. When the epoxidation ratio of the epoxidized natural rubber is 60% by mol or less, a vulcanized rubber composition comes to have good mechanical strength without being excessively hard.

More typical examples of the epoxidized natural rubber include such as an epoxidized natural rubber having an epoxidation ratio of 10% by mol, an epoxidized natural rubber having an epoxidation ratio of 25% by mol, and an epoxidized natural rubber having an epoxidation ratio of 50% by mol.

Here, in the present invention, when the rubber component is caused to contain an additional rubber such as a butadiene rubber and a styrene-butadiene rubber in addition to at least either a natural rubber or a modified natural rubber for the purpose of further reducing the rolling resistance when being used for a pneumatic tire, the combined content of the natural rubber and the modified natural rubber in the rubber component may be 50% by mass or less, preferably 25% by mass or less, and even more preferably 10% by mass or less.

<Other Agents>

Besides the above components, other agents that are conventionally used in the rubber industry, such as reinforcing agents, silane coupling agents, vulcanizing agents, stearic acid, vulcanizing accelerators, vulcanization accelerating aids, oils, hardened resins, waxes and age inhibitors, may be blended in the rubber composition of the present invention.

While reinforcing agents that are used for tire applications may be suitably used, it is particularly preferable to use at least either carbon black or silica.

In the case of using carbon black, the content of the carbon black is preferably within the rage of 2.5 to 150 parts by mass relative to 100 parts by mass of the rubber component. When the content of carbon black is 2.5 parts by mass or more, the reinforcing effect, the durability improving effect and the processability improving effect are particularly good. When it is 150 parts by mass or less, it is possible to prevent decrease in mechanical strength caused by excessive increase in hardness of rubber. The content of carbon black is preferably within the range of 5 to 100 parts by mass, more preferably within the range of 10 to 80 parts by mass, and even more preferably within the range of 20 to 50 parts by mass.

In the case of using silica, the content of the silica is preferably within the rage of 2.5 to 150 parts by mass relative to 100 parts by mass of the rubber component. When the content of silica is 2.5 parts by mass or more, the reinforcing effect is particularly good. When it is 150 parts by mass or less, it is possible to prevent decrease in mechanical strength caused by excessive increase in hardness of rubber or decrease in processability caused by increase in viscosity at the time of producing a vulcanized rubber composition. The content of silica is more preferably within the range of from 5 to 100 parts by mass, even more preferably within the range of from 10 to 80 parts by mass, and still even more preferably within the range of from 20 to 50 parts by mass.

When the vulcanized rubber composition of the present invention contains silica, a silane coupling agent is preferably compounded together with the silica. As silane coupling agents, conventionally known silane coupling agents can be used and examples thereof are sulfide type agents such as bis(3-triethoxysilylpropyl) tetrasulfide, bis(2-triethoxysilylethyl) tetrasulfide, bis(4-triethoxysilylbutyl) tetrasulfide, bis(3-trimethoxysilylpropyl) tetrasulfide, bis(2-trimethoxysilylethyl) tetrasulfide, bis(4-trimethoxysilylbutyl) tetrasulfide, bis(3-triethoxysilylpropyl) trisulfide, bis(2-triethoxysilylethyl) trisulfide, bis(4-triethoxysilylbutyl) trisulfide, bis(3-trimethoxysilylpropyl) trisulfide, bis(2-trimethoxysilyl ethyl) trisulfide, bis(4-trimethoxysilylbutyl) trisulfide, bis(3-triethoxysilylpropyl) disulfide, bis(2-triethoxysilylethyl) disulfide, bis(4-triethoxysilylbutyl) disulfide, bis(3-trimethoxysilylpropyl) disulfide, bis(2-trimethoxysilylethyl) disulfide, bis(4-trimethoxysilylbutyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-trimethoxysilylpropyl methacrylate monosulfide, and 3-trimethoxysilylpropyl methacrylate monosulfide; mercapto type agents such as 3-mercaptopropyltrimethoxysilane, 3-mercaptopropyltriethoxysilane, 2-mercaptoethyltrimethoxysilane, and 2-mercaptoethyltriethoxysilane; vinyl type agents such as vinyltriethoxysilane and vinyltrimethoxysilane; amino type agents such as 3-aminopropyltriethoxysilane, 3-aminopropyltrimethoxysilane, 3-(2-aminoethyl) aminopropyltriethoxysilane, and 3-(2-aminoethyl) aminopropyltrimethoxysilane; glycidoxy type agents such as gamma-glycidoxypropyltriethoxysilane, gamma-glycidoxypropyltrimethoxysilane, gamma-glycidoxypropylmethyldiethoxysilane, and gamma-glycidoxypropylmethyldimethoxysilane; nitro type agents such as 3-nitropropyltrimethoxysilane and 3-nitropropyltrtiethoxysilane; chloro type agents such as 3-chloropropyltrimethoxysilane, 3-chloropropyltriethoxysilane, 2-chloroethyltrimethoxysilane, and 2-chloroethyltriethoxysilane. Such silane coupling agents may be used alone or in combination of two or more kinds.

When further causing a silane coupling agent to be contained, while the content thereof is not particularly limited, it is preferably 1% by mass or more where the incorporated amount of silica is assumed to be 100% by mass. When the content is less than 1% by mass, processability at the time of kneading and extrusion of rubber is prone to deteriorate and at the same time, the reinforcing effect on a vulcanized rubber composition is prone to reduced. In addition, the content of a silane coupling agent is preferably up to 20% by mass, more preferably up to 15% by mass, and even more preferably up to 10% by mass when the incorporated amount of silica is assumed to be 100% by mass. When the content of a silane coupling agent exceeds 20% by mass, even if the incorporated amount of the silane coupling agent is increased, it is small effective for improving processability at the time of kneading and extrusion of rubber and reinforcing effect on a vulcanized rubber composition, however, it is prone to be uneconomical because of an increase in cost.

As the vulcanizing agent, an organic peroxide or a sulfur-based vulcanizing agent may be used. Examples of the organic peroxide that can be employed include such as benzoyl peroxide, dicumyl peroxide, peroxide, cumene hydroperoxide, 2,5-dimethyl-2,5-di(tert-butyl peroxy)hexane, 2,5-dimethyl-2,5-di(benzoyl peroxy)hexane, 2,5-dimethyl-2,5-di(tert-butyl peroxy) hexyne-3 or 1,3-bis(tert-butyl peroxy propyl)benzene, di-tert-butyl peroxy-diisopropyl benzene, tert-butyl peroxy benzene, 2,4-dichlorobenzoyl peroxide, 1,1-di-tert-butyl peroxy-3,3,5-trimethyl siloxane, and n-butyl-4,4-di-tert-butyl peroxyvalerate. Among these, dicumyl peroxide, tert-butyl peroxybenzene and di-tert-butyl peroxy-diisopropyl benzene are preferred. In addition, examples of sulfur-based vulcanizing agents that can be used include such as sulfur and morpholine disulfide. Among these, sulfur is preferred. Such vulcanizing agents may be used alone or in combination of two or more kinds.

As the vulcanizing accelerator, any accelerator may be employed that contains at least one of a sulfenamide type accelerator, a thiazole type accelerator, a thiuram type accelerator, a thiourea type accelerator, a guanidine type accelerator, a dithiocarbamate type accelerator, an aldehyde-amine type or an aldehyde-ammonia type accelerator, an imidazoline type accelerator and a xanthate type accelerator. Examples of sulfenamide type accelerators that can be used include sulfonamide-based compounds such as CBS (N-cyclohexyl-2-benzothiazyl sulfenamide), TBBS (N-tert-butyl-2-benzothiazyl sulfenamide), N,N-dicyclohexyl-2-benzothiazyl sulfenamide, N-oxydiethylene-2-benzothiazyl sulfenamide and N,N-diisopropyl-2-benzothiazole sulfonamide, or the like. Examples of thiazole type accelerators that can be used include thiazole-based compounds such as MBT (2-mercaptobenzothiazole), MBTS (dibenzothiazyl disulfide), sodium salts, zinc salts, copper salts, and cyclohexyl amine salts of 2-mercaptobenzothiazole, 2-(2,4-dinitrophenyl) mercaptobenzothiazole and 2-(2,6-diethyl-4-morpholinothio) benzothiazole, or the like. Examples of thiuram type accelerator that can be used include thiuram-based compounds such as TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabuthylthiuram disulfide and pentamethylenethiuram tetrasulfide, or the like. Examples of thiourea type accelerators that can be used include thiourea compounds such as thiocarbamide, diethyl thiourea, dibutyl thiourea, trimethyl thiourea and diorthotolyl thiourea, or the like. Examples of guanidine type accelerators that can be used include guanidine-based compounds such as diphenylguanidine, diorthotolylguanidine, triphenylguanidine, orthotolylbiguanide and diphenylguanidine phthalate, or the like. Examples of dithiocarbamate type accelerators that can be used include dithiocarbamate-based compounds such as zinc ethylphenyl dithiocarbamate, zinc butylphenyl dithiocarbamate, sodium dimethyl dithiocarbamate, zinc dimethyl dithiocarbamate, zinc diethyl dithiocarbamate, zinc dibutyl dithiocarbamate, zinc diamyl dithiocarbamate, zinc dipropyl dithiocarbamate, a complex salt of zinc pentamethylene dithiocarbamate and piperidine, zinc hexadecyl (or octadecyl) isopropyl dithiocarbamate, zinc dibenzyl dithiocarbamate, sodium diethyl dithiocarbamate, piperidine pentamethylene dithiocarbamate, selenium dimethyl dithiocarbamate, tellurium diethyl dithiocarbamate, and cadmium diamyl dithiocarbamate, or the like. Examples of aldehyde-amine type or aldehyde-ammonia type accelerators that can be used include aldehyde-amine-based or aldehyde-ammonia-based compounds such as reaction products of acetaldehyde and aniline, condensates of butyraldehyde and aniline, hexamethylene tetramine and reaction products of acetaldehyde and ammonia, or the like. Examples of imidazoline type accelerators that can be used include imidazoline-based compounds such as 2-mercaptoimidazoline, or the like. Examples of xanthate type accelerators that can be used include xanthate-based compounds such as zinc dibutyl xanthate, or the like. Such vulcanizing accelerators may be used alone or in combination of two or more kinds.

As the vulcanization accelerating aid, zinc oxide, stearic acid, etc. can be used. As the age inhibitor, amine type age inhibitors, phenol type age inhibitors, imidazole type age inhibitors, metal carbamates, etc. may be used by appropriate selection.

Examples of the oil include such as process oil, vegetable oil and fat, or mixtures thereof Examples of the process oil include such as paraffin type process oil, naphthene type process oil and aromatic process oil. Examples of the vegetable oil and fat include such as castor oil, cotton seed oil, linseed oil, rapeseed oil, soybean oil, palm oil, coconut oil, peanut oil, pine oil, pine tar, tall oil, corn oil, rice bran oil, safflower oil, sesame oil, olive oil, sun flower oil, palm kernel oil, camellia oil, jojoba oil, macadamia nut oil, safflower oil and tung oil.

<Method For Producing Masterbatch Composed of Chemically Modified Microfibril Cellulose and Rubber Component>

In the preparation of the vulcanized rubber composition of the present invention, for example, a masterbatch composed of chemically modified microfibril cellulose and a rubber component (hereinafter, also referred to simply as "masterbatch") may be prepared in advance. The masterbatch can be prepared, for example, by mixing and drying using the following method. While a mixing method using a high-speed disperser is preferred as the mixing method because dispersion can be facilitated through application of a high shearing force and a high pressure, methods using a propeller type stirrer, a rotary stirrer, an electromagnetic stirrer, manually-driven stirring, etc. may also be used.

Examples of a method that can be used for drying a rubber latex include, besides methods ordinarily used for drying a latex, such as a method in which a rubber latex is dried in a heating oven or the like or air-dried after removal of water by water-squeezing rolls, a method in which a mixture solution of a rubber latex and an aqueous dispersion of chemically modified microfibril cellulose is freeze-dried, and as a similar method, a method in which the above mixture solution is dried as it is using impulse waves by pulse combustion. However, from the viewpoint of preventing dispersibility deterioration, a method in which a latex is dried in a heating oven without application of shearing force by water-squeezing rolls, etc., a method of air-drying, and a method in which the above mixture solution is directly subjected to pulse combustion are preferable. In addition, a method in which the mixture solution is dried by microwaves is also preferred. Here, in the method of microwaves, the compatibility of chemically modified microfibril cellulose with a rubber may be further improved by preparing chemically modified microfibril cellulose in which a functional group is introduced in advance, and causing the chemically modified microfibril cellulose to react with a rubber or the like at the same time as drying. Alternatively, microfibril cellulose may be dried while being chemically modified with microwaves.

<Method For Preparation of Vulcanized Rubber Composition>

The vulcanized rubber composition of the present invention can be obtained by mixing the above masterbatch and additional necessary rubber or compounded ingredients by, for example, a conventionally known method using a kneading machine for a rubber, followed by vulcanization by a conventionally known method.

<Pneumatic Tire>

The present invention also provides a pneumatic tire produced by using the vulcanized rubber composition of the present invention described above. FIG. 1 is a schematic sectional view showing an example of the pneumatic tire of the present invention. A pneumatic tire 1 has a tread portion 2, a pair of sidewall portions 3 extending from both ends of tread portion 2 inwardly in the radial direction of the tire, and a bead portion 4 located at the inner end of each sidewall portion 3. In addition, a carcass 6 is provided to extend between bead portions 4 and 4, and a belt layer 7 having hoop effect to be reinforced tread portion 2 is provided outside carcass 6 and inside tread portion 2.

Carcass 6 is formed of at least one carcass ply having a carcass cord arranged at an angle of 70 to 90° relative to a tire equator CO, for example. The carcass ply extends from tread portion 2 to a bead core 5 of bead portion 4 via sidewall portion 3 and further extends around bead core 5 where the carcass ply is folded back from the inside to the outside in the direction of the tire axis to be secured accordingly.

Belt layer 7 is formed of at least two belt plies having belt cords arranged at an angle of 40° or smaller relative to tire equator CO, for example. Belt plies are stacked on each other so that belt cords embedded in the belt plies cross in different directions from each other. Here, a band layer (not shown) for preventing both end portions of belt layer 7 from lifting may, if necessary, be provided at least outside belt layer 7. In this case, the band layer is formed of a continuous ply having an organic fiber cord of low modulus wound in a spiral manner almost in parallel with tire equator CO.

Further, a bead apex rubber 8 is arranged to bead portion 4 to extend from bead core 5 outwardly in the radial direction, and at the same time, an inner liner rubber 9 is provided adjacent to the inside of carcass 6 to form a tire inner surface. The outside of carcass 6 is protected by a clinch rubber 4G and a sidewall rubber 3G.

Here, the tread portion 2 may have a structure composed of a cap tread 2a and a base tread 2b as shown in FIG. 1, for example.

The vulcanized rubber composition of the present invention can be used for, for example, a base tread and a bead apex of a pneumatic tire, an insert rubber of a run-flat tire, a fiber-reinforced rubber (FRR) for improving steering stability, etc. It can also be used for a cap tread, a sidewall, a clinch, etc. Moreover, it can also be used for a breaker cushion rubber, a jointless band, etc.

While FIG. 1 illustrates a pneumatic tire for passenger cars, the present invention is not limited to this and provides pneumatic tires that are used for various types of vehicles including such as trucks, buses and heavy vehicles.

The pneumatic tire of the present invention is produced by a conventionally known method using the vulcanized rubber composition of the present invention. Namely, the rubber composition containing the essential ingredients described above and other compounding agents that are optionally compounded is kneaded and then, it is extruded and processed in conformity with the shape of a desired application portion of a tire at an unvulcanized stage, and molded on a tire molding machine by an ordinary method to form an unvulcanized tire. The pneumatic tire using the vulcanized rubber composition of the present invention can be obtained by heat-pressurizing this unvulcanized tire in a vulcanizer.

Such pneumatic tire of the present invention is fully conscious to resource saving and environmental protection because the content ratio of ingredients derived from petroleum resources is reduced in a member in which at least the vulcanized rubber composition of the present invention has been applied. Moreover, it is an environmentally friendly "ecological tire" and at the same time, it is good in rolling resistance characteristics, steering stability and durability because a vulcanized rubber composition that exhibits excellent rupture characteristics and a low energy loss in a member in which at least the vulcanized rubber composition of the present invention has been applied.

EXAMPLES

The present invention is described in more detail below with reference to examples, but the present invention is not limited thereto.

<Preparation of Masterbatch>

According to the compounding formulation shown below in Tables 1 to 4, NBR masterbatches 1 to 7, polybutadiene masterbatches 1 to 3, NR masterbatches 1 to 15, and ENR masterbatches 1 to 7 were prepared as masterbatches composed of a rubber component and microfibril cellulose. Here, in the following description, each masterbatch of the same identification number may be called collectively as each of the masterbatches 1, and the like.

In each of the masterbatches 1, only a rubber latex was used. Dried products of each of the masterbatches 1 were obtained by adding a predetermined amount of a coagulating agent ordinarily used for a rubber latex, subsequently removing water and drying the resultant in a heating oven at 40° C.

Microfibril cellulose 1 for each of the masterbatches 2, microfibril cellulose 2 for each of the masterbatches 3, and microfibril celluloses 3 to 9 for NR masterbatches 9 to 15, respectively, were each mixed into a rubber by using a high-speed disperser.

Microfibril cellulose 1 is microfibril cellulose that has not been chemically modified. Microfibril celluloses 2 to 9 are chemically modified microfibril celluloses.

Microfibril cellulose 2 was prepared by a method of allowing microfibril cellulose 1 to react with acetic anhydride in the presence of a sulfuric acid catalyst in a mixture solvent composed of acetic acid and toluene to be acetylation, and then exchanging the solvent for water. Here, the substitution degree in the acetylation was adjusted to about 2.

Microfibril cellulose 3 was prepared by a method of substituting microfibril cellulose 1 with toluene, subsequently allowing the resultant to react with butyryl chloride in the presence of a pyridine catalyst to be esterification, and then exchanging the solvent for water. The substitution degree was adjusted to about 0.5.

Microfibril cellulose 4 was prepared by a method of substituting microfibril cellulose 1 with toluene, subsequently allowing the resultant to react with stearoyl chloride in the presence of a pyridine catalyst to be esterification, and then exchanging the solvent for water. The substitution degree was adjusted to about 0.3.

Microfibril cellulose 5 was prepared by a method of allowing microfibril cellulose 1 to react with a mixture of acetic anhydride and butyric anhydride in the presence of a sulfuric acid catalyst in a mixture solvent composed of acetic acid and toluene to be complex esterification, and then exchanging the solvent for water. The substitution degree was adjusted to about 1.

Microfibril cellulose 6 was prepared by a method of substituting microfibril cellulose 1 with toluene, subsequently allowing the resultant to react with butyl isocyanate in the presence of a pyridine catalyst be carbamation, and then exchanging the solvent for water. The substitution degree was adjusted to about 0.4.

Microfibril cellulose 7 was prepared by a method of substituting microfibril cellulose 1 with toluene, subsequently allowing the resultant to react with stearyl isocyanate in the presence of a pyridine catalyst to be carbamation, and then exchanging the solvent for water. The substitution degree was adjusted to about 0.3.

Microfibril cellulose 8 was prepared by a method of substituting microfibril cellulose 1 with toluene, subsequently allowing the resultant to react with phenyl isocyanate in the presence of a pyridine catalyst to be carbamation, and then exchanging the solvent for water. The substitution degree was adjusted to about 0.4.

Microfibril cellulose 9 was prepared by a method of substituting microfibril cellulose 1 with toluene, subsequently allowing the resultant to react with diketene in the presence of a pyridine catalyst to be β-ketoesterification, and then exchanging the solvent for water. The substitution degree was adjusted to about 0.4.

Distilled water were added appropriately to microfibril celluloses 1 to 9, respectively, and then the mixtures were stirred with a high-speed disperser for 30 minutes to produce dispersions. Each of the dispersions and the rubber latex were weighed so that a proportion shown in a table would be obtained, and then were further mixed together with a high-speed disperser for 10 minutes to obtain a mixture, As the high-speed disperser, a batch type high-speed disperser T65D (Ultraturrax T25) manufactured by IKA was used for all the steps described above and treatment was conducted at a rotation speed of 7000 rpm.

When the viscosity was so high at mixing that it was difficult to conduct mixing or stirring, water was added appropriately to dilute the mixture, followed by stirring.

Necessary amounts of a coagulating agent ordinarily used for the rubber latex were added to the resulting mixtures, respectively, thereby precipitating a rubber and microfibrils 1 to 9. They were washed with water, dehydrated, and dried in a heating oven at 40° C. to yield each of the masterbatches 2, 3 and NR masterbatches 9 to 15.

Masterbatches 4 to 7 were prepared by mixing rubber latex with microfibril cellulose 1 or 2 so that the ratios shown in each table would be achieved.

As the mixing method, a propeller type stirrer was used instead of the high-speed disperser described above. First, water and microfibril cellulose were stirred at 700 rpm for 2 hours. Then, a rubber latex was further added, followed by mixing for 2 hours. When the viscosity was so high at mixing of the rubber latex with microfibril cellulose 1 or 2 that it was difficult to conduct mixing or stirring, distilled water was added appropriately to dilute the mixture, followed by stirring. Then, coagulation, washing, dehydration, and drying were performed.

TABLE 1

|  |  | NBR masterbatch 1 | NBR masterbatch 2 | NBR masterbatch 3 | NBR masterbatch 4 | NBR masterbatch 5 | NBR masterbatch 6 | NBR masterbatch 7 |
|---|---|---|---|---|---|---|---|---|
| Compounding ingredient (parts by mass) | NBR latex 1 | 247 | 247 | 247 | 247 | 247 | 247 | 247 |
|  | Microfibril cellulose 1 | — | 100 | — | 100 | — | 300 | — |
|  | Microfibril cellulose 2 | — | — | 100 | — | 100 | — | 300 |
| Stirring method | | — | High-speed disperser | High-speed disperser | Propeller type stirrer | Propeller type stirrer | Propeller type stirrer | Propeller type stirrer |

TABLE 2

|  |  | Polybutadiene masterbatch 1 | Polybutadiene masterbatch 2 | Polybutadiene masterbatch 3 |
|---|---|---|---|---|
| Compounding ingredient (parts by mass) | Polybutadiene latex 1 | 185 | 185 | 185 |
|  | Microfibril cellulose 1 | — | 100 | — |
|  | Microfibril cellulose 2 | — | — | 100 |
| Stirring method | | — | High-speed disperser | High-speed disperser |

TABLE 3

|  |  | NR masterbatch 1 | NR masterbatch 2 | NR masterbatch 3 | NR masterbatch 4 | NR masterbatch 5 | NR masterbatch 6 | NR masterbatch 7 |
|---|---|---|---|---|---|---|---|---|
| Compounding ingredient (parts by mass) | NR latex 1 | 167 | 167 | 167 | 167 | 167 | 167 | 167 |
|  | Microfibril cellulose 1 | — | 100 | — | 100 | — | 300 | — |
|  | Microfibril cellulose 2 | — | — | 100 | — | 100 | — | 300 |
|  | Kevlar dispersion | — | — | — | — | — | — | — |
|  | Microfibril cellulose 3 | — | — | — | — | — | — | — |
|  | Microfibril cellulose 4 | — | — | — | — | — | — | — |
|  | Microfibril cellulose 5 | — | — | — | — | — | — | — |
|  | Microfibril cellulose 6 | — | — | — | — | — | — | — |
|  | Microfibril cellulose 7 | — | — | — | — | — | — | — |
|  | Microfibril cellulose 8 | — | — | — | — | — | — | — |
|  | Microfibril cellulose 9 | — | — | — | — | — | — | — |
| Stirring method | | — | High-speed disperser | High-speed disperser | Propeller type stirrer | Propeller type stirrer | Propeller type stirrer | Propeller type stirrer |

|  |  | NR masterbatch 8 | NR masterbatch 9 | NR masterbatch 10 | NR masterbatch 11 | NR masterbatch 12 | NR masterbatch 13 | NR masterbatch 14 | NR masterbatch 15 |
|---|---|---|---|---|---|---|---|---|---|
| Compounding ingredient (parts by mass) | NR latex 1 | 167 | 167 | 167 | 167 | 167 | 167 | 167 | 167 |
|  | Microfibril cellulose 1 | — | — | — | — | — | — | — | — |
|  | Microfibril cellulose 2 | — | — | — | — | — | — | — | — |
|  | Kevlar dispersion | 100 | — | — | — | — | — | — | — |
|  | Microfibril cellulose 3 | — | 100 | — | — | — | — | — | — |
|  | Microfibril cellulose 4 | — | — | 100 | — | — | — | — | — |
|  | Microfibril cellulose 5 | — | — | — | 100 | — | — | — | — |
|  | Microfibril cellulose 6 | — | — | — | — | 100 | — | — | — |
|  | Microfibril cellulose 7 | — | — | — | — | — | 100 | — | — |
|  | Microfibril cellulose 8 | — | — | — | — | — | — | 100 | — |
|  | Microfibril cellulose 9 | — | — | — | — | — | — | — | 100 |

TABLE 3-continued

| | cellulose 9 | | | | | | | |
|---|---|---|---|---|---|---|---|---|
| Stirring method | | Propeller type stirrer | High-speed disperser | High-speed disperser | High-speed disperser | High-speed disperser | High-speed disperser | High-speed disperser | High-speed disperser |

TABLE 4

| | | ENR masterbatch 1 | ENR masterbatch 2 | ENR masterbatch 3 | ENR masterbatch 4 | ENR masterbatch 5 | ENR masterbatch 6 | ENR masterbatch 7 |
|---|---|---|---|---|---|---|---|---|
| Compounding ingredient (parts by mass) | ENR latex 1 | 333 | 333 | 333 | 333 | 333 | 333 | 333 |
| | Microfibril cellulose 1 | — | 100 | — | 100 | — | 300 | — |
| | Microfibril cellulose 2 | — | — | 100 | — | 100 | — | 300 |
| Stirring method | | — | High-speed disperser | High-speed disperser | Propeller type stirrer | Propeller type stirrer | Propeller type stirrer | Propeller type stirrer |

The details of each compounding ingredients shown in each table are shown below.

NBR latex 1: NIPOL 1561 (produced by Zeon Corporation, solid content 40.5% by mass, average particle diameter 50 nm, Tg=−11° C.).

Microfibril cellulose 1: CELISH KY-100G (produced by Daicel Chemical Industries, Ltd., solid content 10% by mass, moisture content 90% by mass, average fiber diameter 0.1 μm).

Microfibril cellulose 2: Acetylation product (67% by mol-acetylated microfibril cellulose 1 (substitution degree: about 2), solid content 10% by mass, moisture content 90% by mass, average fiber diameter 0.1 μm).

Microfibril cellulose 3: Esterification product (50% by mol-acetylated microfibril cellulose 1 (substitution degree: about 0.5), solid content about 10% by mass, moisture content about 90% by mass, average fiber diameter 0.1 μm).

Microfibril cellulose 4: Esterification product (30% by mol-acetylated microfibril cellulose 1 (substitution degree: about 0.3), solid content about 10% by mass, moisture content about 90% by mass, average fiber diameter 0.1 μm).

Microfibril cellulose 5: Complex esterification product (100% by mol-acetylated microfibril cellulose 1 (substitution degree: about 1), solid content about 10% by mass, moisture content about 90% by mass, average fiber diameter 0.1 μm).

Microfibril cellulose 6: Carbamatation product (40% by mol-acetylated microfibril cellulose 1 (substitution degree: about 0.4), solid content about 10% by mass, moisture content about 90% by mass, average fiber diameter 0.1 μm).

Microfibril cellulose 7: Carbamatation product (30% by mol-acetylated microfibril cellulose 1 (substitution degree: about 0.3), solid content about 10% by mass, moisture content about 90% by mass, average fiber diameter 0.1 μm).

Microfibril cellulose 8: Carbamatation product (40% by mol-acetylated microfibril cellulose 1 (substitution degree: about 0.4), solid content about 10% by mass, moisture content about 90% by mass, average fiber diameter 0.1 μm).

Microfibril cellulose 9: β-Ketoesterification product (40% by mol-acetylated microfibril cellulose 1 (substitution degree: about 0.4), solid content about 10% by mass, moisture content about 90% by mass, average fiber diameter 0.1 μm).

Polybutadiene latex 1: NIPOL LX111A2 (produced by Zeon Corporation, solid content 54.0% by mass, average particle diameter 300 nm).

NR latex 1: HYTEX HA (natural rubber latex produced by Golden Hope Plantations, solid content 60% by mass, average particle diameter 1 μm).

Kevlar dispersion: Solid content 23% by mass, moisture content 77% by mass, average fiber diameter 14 μm.

ENR latex 1: Epoxidized natural rubber latex obtained by epoxidizing the NR latex with formic acid and hydrogen peroxide; solid content 30% by mass, epoxidation ratio 25%, average particle diameter 1 μm.

Examples 1 to 18, Comparative Examples 1 to 28

Using each masterbatch obtained in the form of dry products by the above method according to the compounding formulation shown in Tables 1 to 4, vulcanized rubber compositions were prepared by the compounding formulation shown in Tables 5 to 10.

The compounding ingredients according to the compounding formulation in Step 1 of Examples 11 to 18 in Tables 5 to 9 and Table 10 were charged into a 250 cc labo plastomill produced by Toyo Seiki Seisaku-sho, Ltd. so that the filling ratio would become 65%. Each mixture was then kneaded for 3 to 8 minutes under a condition of a rotation speed of 80 rpm until the indicated temperature of the kneading machine reached 140° C. Here, as to Comparative Examples 19-28, in order to examine the effect of the present masterbatch method, NR masterbatch 1 was kneaded in a 250 cc labo plastomill at the same filling ratio and the same rotation rate as those mentioned above, and then microfibril celluloses 1 to 9 were respectively charged thereinto. Each mixture was then kneaded for 3 to 8 minutes in total until the indicated temperature of the kneading machine reached 140° C. To each of the kneaded products obtained in Step 1, sulfur and a vulcanization accelerator were added according to the compounding formulation shown in Step 2, followed by kneading with an open roll for 3 minutes under a condition of 50° C. to obtain an unvulcanized rubber composition. Each of the unvulcanized rubber compositions obtained in Step 2 was shaped into sizes required for respective evaluations described below and then press-vulcanized at 160° C. for 20 minutes. Thus, vulcanized rubber compositions of each example and each comparative example were obtained.

Evaluations shown below were carried out using the vulcanized rubber compositions produced by the above method. Here, commonly in all evaluations, Comparative Example 1 was used as a standard compounding in evaluations for Examples 1 to 3 and Comparative Examples 1 to 4 shown in Table 5, Comparative Example 5 was used in evaluations for Example 4 and Comparative Examples 5 and 6 shown in Table 6, Comparative Example 7 was used in evaluations for Examples 5 to 7 and Comparative Examples 7 to 13 shown in Tables 7 and 8, and Comparative Example 14 was used in evaluations for Examples 8 to 10 and Comparative Examples 14 to 17 shown in Table 9, respectively. Comparative Example 18 was used as a standard compounding for Examples 11 to 18 and Comparative Examples 19 to 28 shown in Table 10.

(Fiber Dispersion State)

Cross sections of specimens made of the vulcanized rubber compositions of each example and each comparative example and the specimens after being subjected to a tensile test by the method disclosed below were observed respectively, and were evaluated according to the following criteria.

A: No aggregates are visually found and no foreign matters are also found in a fracture cross section after a tensile test.

B: Fine aggregates are visually found and fine foreign matters are also found in a fracture cross section after a tensile test.

C: Aggregates that are not fine are visually found.

(Tensile Test)

A tensile strength and a breaking elongation were determined in accordance with JIS K6251 "Rubber, vulcanized or thermoplastic—Determination of tensile stress-strain properties." A tensile strength index and a breaking elongation index were calculated by using the following equations:

Tensile strength index=(tensile strength of each compounding)/(tensile strength of standard compounding)×100

Breaking elongation index=(breaking elongation of each compounding)/(breaking elongation of standard compounding)×100 where both the tensile strength and the breaking elongation of a standard compounding are assumed to be 100. Larger indexes each indicate that the vulcanized rubber composition is reinforced better, that the rubber has greater mechanical strength and that better fracture characteristics.

(Tear Test)

Tear strength (N/mm) was measured using an angle-shaped specimen with no notch in accordance with JIS K6252 "Rubber, vulcanized or thermoplastic—Determination of tear strength." A tear strength index was calculated by using the following equation:

Tear strength index=(tear strength of each compounding)/(tear strength of standard compounding)×100 where the tear strength of the standard composition is assumed to be 100. A larger index indicates that the tear strength is greater and it is more suitable especially as a rubber composition of side wall.

(Steering Stability Index, Rolling Resistance Index)

A rubber slab sheet sized 2 mm×130 mm×130 mm made of a vulcanized rubber composition prepared by the above method was produced, and then a specimen for measurement was cut out from this rubber slab sheet. Using a viscoelastic spectrometer VES (manufactured by Iwamoto Seisakusho Co., Ltd.), the $E^*$ (complex modulus) and the tan $\delta$ (loss tangent) of each specimen for measurement were measured under a condition of a temperature of 70° C., an initial strain of 10%, a dynamic strain of 2% and a frequency of 10 Hz. A steering stability index and a rolling resistance index were calculated by using the following equations:

Steering stability index=($E^*$ of each compounding)/($E^*$ of standard compounding)×100

Rolling resistance index=(tan $\delta$ of each compounding)/(tan $\delta$ of standard compounding)×100 where the $E^*$ and the tan $\delta$ of a standard composition are assumed to be 100, respectively. A larger steering stability index indicates that it is possible to impart better steering stability to a pneumatic tire. On the other hand, a smaller rolling resistance index indicates that it is possible to impart better rolling resisting characteristics to a pneumatic tire.

TABLE 5

|  |  |  | Comparative Example 1 | Comparative Example 2 | Example 1 | Comparative Example 3 | Example 2 | Comparative Example 4 | Example 3 |
|---|---|---|---|---|---|---|---|---|---|
| Compounding ingredient (parts by mass) | Step 1 | NBR masterbatch 1 | 100 | — | — | — | — | — | — |
|  |  | NBR masterbatch 2 | — | 110 | — | — | — | — | — |
|  |  | NBR masterbatch 3 | — | — | 110 | — | — | — | — |
|  |  | NBR masterbatch 4 | — | — | — | 110 | — | — | — |
|  |  | NBR masterbatch 5 | — | — | — | — | 110 | — | — |
|  |  | NBR masterbatch 6 | — | — | — | — | — | 130 | — |
|  |  | NBR masterbatch 7 | — | — | — | — | — | — | 130 |
|  |  | Carbon black | 15 | 15 | 15 | 15 | 15 | 15 | 15 |
|  |  | Stearic acid | 1.5 | 1.5 | 1.5 | 1.5 | 1.5 | 1.5 | 1.5 |
|  |  | Zinc oxide | 3 | 3 | 3 | 3 | 3 | 3 | 3 |
|  |  | Age inhibitor | 2 | 2 | 2 | 2 | 2 | 2 | 2 |
|  | Step 2 | Sulfur | 1.5 | 1.5 | 1.5 | 1.5 | 1.5 | 1.5 | 1.5 |
|  |  | Vulcanization accelerator MBTS | 1.5 | 1.5 | 1.5 | 1.5 | 1.5 | 1.5 | 1.5 |
|  |  | Vulcanization accelerator TMTM | 0.5 | 0.5 | 0.5 | 0.5 | 0.5 | 0.5 | 0.5 |
|  |  | Vulcanization accelerator CBS | — | — | — | — | — | — | — |
| Evaluation |  | Fiber dispersion state | — | B | A | C | A | C | A |
|  |  | Tensile strength index | 100 | 103 | 100 | 66 | 97 | 73 | 207 |
|  |  | Break elongation index | 100 | 109 | 96 | 85 | 93 | 79 | 90 |
|  |  | Tear strength index | 100 | 108 | 139 | 105 | 136 | 234 | 265 |
|  |  | Steering stability index | 100 | 147 | 156 | 129 | 146 | 253 | 363 |
|  |  | Rolling resistance index | 100 | 174 | 106 | 148 | 108 | 252 | 122 |

TABLE 6

|  |  |  | Comparative Example 5 | Comparative Example 6 | Example 4 |
|---|---|---|---|---|---|
| Compounding ingredient (parts by mass) | Step 1 | Polybutadiene masterbatch 1 | 100 | — | — |
|  |  | Polybutadiene masterbatch 2 | — | 110 | — |
|  |  | Polybutadiene masterbatch 3 | — | — | 130 |
|  |  | Carbon black | 15 | 15 | 15 |
|  |  | Stearic acid | 1.5 | 1.5 | 1.5 |
|  |  | Zinc oxide | 3 | 3 | 3 |
|  |  | Age inhibitor | 2 | 2 | 2 |
|  | Step 2 | Sulfur | 1.5 | 1.5 | 1.5 |
|  |  | Vulcanization accelerator MBTS | — | — | — |
|  |  | Vulcanization accelerator TMTM | — | — | — |
|  |  | Vulcanization accelerator CBS | 1.0 | 1.0 | 1.0 |
| Evaluation |  | Fiber dispersion state | — | C | A |
|  |  | Tensile strength index | 100 | 98 | 105 |
|  |  | Break elongation index | 100 | 104 | 104 |
|  |  | Tear strength index | 100 | 103 | 141 |
|  |  | Steering stability index | 100 | 142 | 159 |
|  |  | Rolling resistance index | 100 | 179 | 105 |

TABLE 7

|  |  |  | Comparative Example 7 | Comparative Example 8 | Example 5 | Comparative Example 9 | Example 6 | Comparative Example 10 | Example 7 |
|---|---|---|---|---|---|---|---|---|---|
| Compounding ingredient (parts by mass) | Step 1 | NR masterbatch 1 | 100 | — | — | — | — | — | — |
|  |  | NR masterbatch 2 | — | 110 | — | — | — | — | — |
|  |  | NR masterbatch 3 | — | — | 110 | — | — | — | — |
|  |  | NR masterbatch 4 | — | — | — | 110 | — | — | — |
|  |  | NR masterbatch 5 | — | — | — | — | 110 | — | — |
|  |  | NR masterbatch 6 | — | — | — | — | — | 130 | — |
|  |  | NR masterbatch 7 | — | — | — | — | — | — | 130 |
|  |  | NR masterbatch 8 | — | — | — | — | — | — | — |
|  |  | Syndiotactic component-containing polybutadiene rubber | — | — | — | — | — | — | — |
|  |  | Carbon black | 15 | 15 | 15 | 15 | 15 | 15 | 15 |
|  |  | Stearic acid | 1.5 | 1.5 | 1.5 | 1.5 | 1.5 | 1.5 | 1.5 |
|  |  | Zinc oxide | 3 | 3 | 3 | 3 | 3 | 3 | 3 |
|  |  | Age inhibitor | 2 | 2 | 2 | 2 | 2 | 2 | 2 |
|  | Step 2 | Sulfur | 1.5 | 1.5 | 1.5 | 1.5 | 1.5 | 1.5 | 1.5 |
|  |  | Vulcanization accelerator MBTS | — | — | — | — | — | — | — |
|  |  | Vulcanization accelerator TMTM | — | — | — | — | — | — | — |
|  |  | Vulcanization accelerator CBS | 1.0 | 1.0 | 1.0 | 1.0 | 1.0 | 1.0 | 1.0 |
| Evaluation |  | Fiber dispersion state | — | C | A | C | A | C | A |
|  |  | Tensile strength index | 100 | 112 | 169 | 101 | 159 | 103 | 157 |
|  |  | Break elongation index | 100 | 86 | 126 | 62 | 121 | 30 | 44 |
|  |  | Tear strength index | 100 | 147 | 144 | 165 | 143 | 139 | 137 |
|  |  | Steering stability index | 100 | 192 | 168 | 226 | 158 | 1911 | 1672 |
|  |  | Rolling resistance index | 100 | 124 | 77 | 383 | 87 | 557 | 196 |

TABLE 8

|  |  |  | Comparative Example 11 | Comparative Example 12 | Comparative Example 13 |
|---|---|---|---|---|---|
| Compounding ingredient (parts by mass) | Step 1 | NR masterbatch 1 | — | 50 | — |
|  |  | NR masterbatch 2 | — | — | — |
|  |  | NR masterbatch 3 | — | — | — |
|  |  | NR masterbatch 4 | — | — | — |
|  |  | NR masterbatch 5 | — | — | — |
|  |  | NR masterbatch 6 | — | — | — |
|  |  | NR masterbatch 7 | — | — | — |
|  |  | NR masterbatch 8 | 110 | — | — |
|  |  | Syndiotactic component-containing polybutadiene rubber | — | 50 | 100 |
|  |  | Carbon black | 15 | 15 | 15 |
|  |  | Stearic acid | 1.5 | 1.5 | 1.5 |

TABLE 8-continued

|  |  |  | Comparative Example 11 | Comparative Example 12 | Comparative Example 13 |
|---|---|---|---|---|---|
|  | Step 2 | Zinc oxide | 3 | 3 | 3 |
|  |  | Age inhibitor | 2 | 2 | 2 |
|  |  | Sulfur | 1.5 | 1.5 | 1.5 |
|  |  | Vulcanization accelerator MBTS | — | — | — |
|  |  | Vulcanization accelerator TMTM | — | — | — |
|  |  | Vulcanization accelerator CBS | 1.0 | 1.0 | 1.0 |
| Evaluation |  | Fiber dispersion state | B | A | A |
|  |  | Tensile strength index | 78 | 115 | 73 |
|  |  | Break elongation index | 18 | 100 | 58 |
|  |  | Tear strength index | 157 | 150 | 141 |
|  |  | Steering stability index | 1470 | 135 | 231 |
|  |  | Rolling resistance index | 618 | 473 | 539 |

TABLE 9

|  |  |  | Comparative Example 14 | Comparative Example 15 | Example 8 | Comparative Example 16 | Example 9 | Comparative Example 17 | Example 10 |
|---|---|---|---|---|---|---|---|---|---|
| Compounding ingredient (parts by mass) | Step 1 | ENR masterbatch 1 | 100 | — | — | — | — | — | — |
|  |  | ENR masterbatch 2 | — | 110 | — | — | — | — | — |
|  |  | ENR masterbatch 3 | — | — | 110 | — | — | — | — |
|  |  | ENR masterbatch 4 | — | — | — | 110 | — | — | — |
|  |  | ENR masterbatch 5 | — | — | — | — | 110 | — | — |
|  |  | ENR masterbatch 6 | — | — | — | — | — | 130 | — |
|  |  | ENR masterbatch 7 | — | — | — | — | — | — | 130 |
|  |  | Carbon black | 15 | 15 | 15 | 15 | 15 | 15 | 15 |
|  |  | Stearic acid | 1.5 | 1.5 | 1.5 | 1.5 | 1.5 | 1.5 | 1.5 |
|  |  | Zinc oxide | 3 | 3 | 3 | 3 | 3 | 3 | 3 |
|  |  | Age inhibitor | 2 | 2 | 2 | 2 | 2 | 2 | 2 |
|  | Step 2 | Sulfur | 1.5 | 1.5 | 1.5 | 1.5 | 1.5 | 1.5 | 1.5 |
|  |  | Vulcanization accelerator MBTS | — | — | — | — | — | — | — |
|  |  | Vulcanization accelerator TMTM | — | — | — | — | — | — | — |
|  |  | Vulcanization accelerator CBS | 1.0 | 1.0 | 1.0 | 1.0 | 1.0 | 1.0 | 1.0 |
| Evaluation |  | Fiber dispersion state | — | B | A | C | A | C | A |
|  |  | Tensile strength index | 100 | 18 | 117 | 15 | 114 | 112 | 122 |
|  |  | Break elongation index | 100 | 23 | 98 | 19 | 95 | 2 | 10 |
|  |  | Tear strength index | 100 | 104 | 152 | 99 | 147 | 193 | 195 |
|  |  | Steering stability index | 100 | 224 | 270 | 202 | 250 | 4178 | 4074 |
|  |  | Rolling resistance index | 100 | 79 | 83 | 81 | 85 | 519 | 344 |

TABLE 10

|  |  |  | Comparative Example 18 | Comparative Example 19 | Comparative Example 20 | Comparative Example 21 | Example 11 | Comparative Example 22 | Example 12 |
|---|---|---|---|---|---|---|---|---|---|
| Compounding ingredient (parts by mass) | Step 1 | NR masterbatch 1 | 100 | 100 | — | 100 | — | 100 | — |
|  |  | NR masterbatch 2 | — | — | 110 | — | — | — | — |
|  |  | NR masterbatch 3 | — | — | — | — | 110 | — | — |
|  |  | NR masterbatch 9 | — | — | — | — | — | — | 110 |
|  |  | NR masterbatch 10 | — | — | — | — | — | — | — |
|  |  | NR masterbatch 11 | — | — | — | — | — | — | — |
|  |  | NR masterbatch 12 | — | — | — | — | — | — | — |
|  |  | NR masterbatch 13 | — | — | — | — | — | — | — |
|  |  | NR masterbatch 14 | — | — | — | — | — | — | — |
|  |  | NR masterbatch 15 | — | — | — | — | — | — | — |
|  |  | Microfibril cellulose 1 | — | 10 | — | — | — | — | — |
|  |  | Microfibril cellulose 2 | — | — | — | 10 | — | — | — |
|  |  | Microfibril cellulose 3 | — | — | — | — | — | 10 | — |
|  |  | Microfibril cellulose 4 | — | — | — | — | — | — | — |
|  |  | Microfibril cellulose 5 | — | — | — | — | — | — | — |
|  |  | Microfibril cellulose 6 | — | — | — | — | — | — | — |
|  |  | Microfibril cellulose 7 | — | — | — | — | — | — | — |
|  |  | Microfibril cellulose 8 | — | — | — | — | — | — | — |
|  |  | Microfibril cellulose 9 | — | — | — | — | — | — | — |
|  |  | Stearic acid | 1.5 | 1.5 | 1.5 | 1.5 | 1.5 | 1.5 | 1.5 |
|  |  | Zinc oxide | 3 | 3 | 3 | 3 | 3 | 3 | 3 |
|  |  | Age inhibitor | 2 | 2 | 2 | 2 | 2 | 2 | 2 |

TABLE 10-continued

|  |  |  |  |  |  |  |  |  |  |
|---|---|---|---|---|---|---|---|---|---|
|  | Step 2 | Sulfur | 1.5 | 1.5 | 1.5 | 1.5 | 1.5 | 1.5 | 1.5 |
|  |  | Vulcanization accelerator MBTS | — | — | — | — | — | — | — |
|  |  | Vulcanization accelerator TMTM | — | — | — | — | — | — | — |
|  |  | Vulcanization accelerator CBS | 1.0 | 1.0 | 1.0 | 1.0 | 1.0 | 1.0 | 1.0 |
| Evaluation | Fiber dispersion state |  | — | C | C | C | A | C | A |
|  | Tensile strength index |  | 100 | 103 | 112 | 101 | 168 | 99 | 158 |
|  | Break elongation index |  | 100 | 78 | 90 | 90 | 111 | 84 | 113 |
|  | Tear strength index |  | 100 | 78 | 149 | 76 | 124 | 69 | 123 |
|  | Steering stability index |  | 100 | 106 | 400 | 100 | 194 | 100 | 200 |
|  | Rolling resistance index |  | 100 | 119 | 112 | 85 | 81 | 85 | 65 |

|  |  |  | Comparative Example 23 | Example 13 | Comparative Example 24 | Example 14 | Comparative Example 25 | Example 15 | Comparative Example 26 |
|---|---|---|---|---|---|---|---|---|---|
| Compounding ingredient (parts by mass) | Step 1 | NR masterbatch 1 | 100 | — | 100 | — | 100 | — | 100 |
|  |  | NR masterbatch 2 | — | — | — | — | — | — | — |
|  |  | NR masterbatch 3 | — | — | — | — | — | — | — |
|  |  | NR masterbatch 9 | — | — | — | — | — | — | — |
|  |  | NR masterbatch 10 | — | 110 | — | — | — | — | — |
|  |  | NR masterbatch 11 | — | — | — | 110 | — | — | — |
|  |  | NR masterbatch 12 | — | — | — | — | — | 110 | — |
|  |  | NR masterbatch 13 | — | — | — | — | — | — | — |
|  |  | NR masterbatch 14 | — | — | — | — | — | — | — |
|  |  | NR masterbatch 15 | — | — | — | — | — | — | — |
|  |  | Microfibril cellulose 1 | — | — | — | — | — | — | — |
|  |  | Microfibril cellulose 2 | — | — | — | — | — | — | — |
|  |  | Microfibril cellulose 3 | — | — | — | — | — | — | — |
|  |  | Microfibril cellulose 4 | 10 | — | — | — | — | — | — |
|  |  | Microfibril cellulose 5 | — | — | 10 | — | — | — | — |
|  |  | Microfibril cellulose 6 | — | — | — | — | 10 | — | — |
|  |  | Microfibril cellulose 7 | — | — | — | — | — | — | 10 |
|  |  | Microfibril cellulose 8 | — | — | — | — | — | — | — |
|  |  | Microfibril cellulose 9 | — | — | — | — | — | — | — |
|  |  | Stearic acid | 1.5 | 1.5 | 1.5 | 1.5 | 1.5 | 1.5 | 1.5 |
|  |  | Zinc oxide | 3 | 3 | 3 | 3 | 3 | 3 | 3 |
|  |  | Age inhibitor | 2 | 2 | 2 | 2 | 2 | 2 | 2 |
|  | Step 2 | Sulfur | 1.5 | 1.5 | 1.5 | 1.5 | 1.5 | 1.5 | 1.5 |
|  |  | Vulcanization accelerator MBTS | — | — | — | — | — | — | — |
|  |  | Vulcanization accelerator TMTM | — | — | — | — | — | — | — |
|  |  | Vulcanization accelerator CBS | 1.0 | 1.0 | 1.0 | 1.0 | 1.0 | 1.0 | 1.0 |
| Evaluation | Fiber dispersion state |  | C | A | C | A | C | A | C |
|  | Tensile strength index |  | 114 | 154 | 97 | 163 | 109 | 162 | 122 |
|  | Break elongation index |  | 91 | 108 | 87 | 117 | 75 | 92 | 80 |
|  | Tear strength index |  | 73 | 112 | 71 | 129 | 80 | 121 | 78 |
|  | Steering stability index |  | 112 | 182 | 112 | 247 | 106 | 271 | 106 |
|  | Rolling resistance index |  | 88 | 92 | 112 | 77 | 119 | 100 | 108 |

|  |  |  | Example 16 | Comparative Example 27 | Example 17 | Comparative Example 28 | Example 18 |
|---|---|---|---|---|---|---|---|
| Compounding ingredient (parts by mass) | Step 1 | NR masterbatch 1 | — | 100 | — | 100 | — |
|  |  | NR masterbatch 2 | — | — | — | — | — |
|  |  | NR masterbatch 3 | — | — | — | — | — |
|  |  | NR masterbatch 9 | — | — | — | — | — |
|  |  | NR masterbatch 10 | — | — | — | — | — |
|  |  | NR masterbatch 11 | — | — | — | — | — |
|  |  | NR masterbatch 12 | — | — | — | — | — |
|  |  | NR masterbatch 13 | 110 | — | — | — | — |
|  |  | NR masterbatch 14 | — | — | 110 | — | — |
|  |  | NR masterbatch 15 | — | — | — | — | 110 |
|  |  | Microfibril cellulose 1 | — | — | — | — | — |
|  |  | Microfibril cellulose 2 | — | — | — | — | — |
|  |  | Microfibril cellulose 3 | — | — | — | — | — |
|  |  | Microfibril cellulose 4 | — | — | — | — | — |
|  |  | Microfibril cellulose 5 | — | — | — | — | — |
|  |  | Microfibril cellulose 6 | — | — | — | — | — |
|  |  | Microfibril cellulose 7 | — | — | — | — | — |
|  |  | Microfibril cellulose 8 | — | 10 | — | — | — |
|  |  | Microfibril cellulose 9 | — | — | — | 10 | — |
|  |  | Stearic acid | 1.5 | 1.5 | 1.5 | 1.5 | 1.5 |
|  |  | Zinc oxide | 3 | 3 | 3 | 3 | 3 |
|  |  | Age inhibitor | 2 | 2 | 2 | 2 | 2 |
|  | Step 2 | Sulfur | 1.5 | 1.5 | 1.5 | 1.5 | 1.5 |
|  |  | Vulcanization accelerator | — | — | — | — | — |

TABLE 10-continued

| | | | | | | |
|---|---|---|---|---|---|---|
| | MBTS Vulcanization accelerator TMTM | — | — | — | — | — |
| | Vulcanization accelerator CBS | 1.0 | 1.0 | 1.0 | 1.0 | 1.0 |
| Evaluation | Fiber dispersion state | A | C | A | C | A |
| | Tensile strength index | 149 | 123 | 164 | 102 | 125 |
| | Break elongation index | 87 | 86 | 97 | 82 | 98 |
| | Tear strength index | 120 | 83 | 127 | 68 | 111 |
| | Steering stability index | 241 | 118 | 288 | 88 | 229 |
| | Rolling resistance index | 104 | 112 | 100 | 119 | 85 |

The details of the compounding ingredients shown in Tables 5 to 10 are shown below.

Carbon black: SEAST SO (FEF carbon produced by Tokai Carbon Co., Ltd.).

Stearic acid: KIRI (produced by NOF Corporation).

Zinc oxide: Zinc oxide No. 2 (produced by Mitsui Mining and Smelting Co., Ltd.).

Age inhibitor: NOCRAC 6C (produced by Ouchi Shinko Chemical Industrial Co., Ltd.).

Sulfur: Sulfur powder (produced by Tsurumi Chemical Industry Co., Ltd.).

Vulcanization accelerator MBTS NOCCELER DM (produced by Ouchi Shinko Chemical Industrial Co., Ltd.).

Vulcanization accelerator TMTM: NOCCELER TS (produced by Ouchi Shinko Chemical Industrial Co., Ltd.).

Vulcanization accelerator CBS: NOCCELER CZ (produced by Ouchi Shinko Chemical Industrial Co., Ltd.).

Syndiotactic component-containing polybutadiene rubber: UBEPOL VCR412 (produced by Ube Industries, Ltd., n-hexane-insoluble fraction (showing an amount of syndiotactic polybutadiene crystals) 12.0% by mass, cis:trans:vinyl=98:1:1).

The results shown in Tables 5 to 9 show that use of chemically modified microfibril cellulose is prone to be able to highly achieve good tensile characteristics and good steering stability without greatly reducing a rolling resistance index in comparison to comparative examples using no microfibril cellulose, comparative examples using microfibril cellulose having not been chemically modified, comparative examples in which a Kevlar dispersion was incorporated as another fiber, and comparative examples in which a crystalline polymer, a syndiotactic component-containing polybutadiene rubber was incorporated, respectively. In addition, in each example, the fiber dispersion state was better than comparative examples using microfibril cellulose having not been chemically modified.

The results given in Table 10 show that even if using chemically modified microfibril cellulose, a method using the chemically modified microfibril cellulose in the form of a masterbatch prepared by complexing a rubber latex with the chemically modified microfibril cellulose in a water medium in advance as in the present invention rather than adding the chemically modified microfibril cellulose to a rubber by dry blending is necessary in order to highly achieve good tensile characteristics and good steering stability without deteriorating a good fiber dispersion state, in other words, rolling resistance characteristics.

It should be construed that the embodiments and Examples shown herein are only illustrative and non-limiting in all respects. The scope of the present invention is not shown by the description provided above, but is shown by the claims, and includes meanings equivalent to the claims and all modifications within the range of equivalence to the claims.

INDUSTRIAL APPLICABILITY

The vulcanized rubber composition of the present invention can be preferably used for, for example, a base tread and a bead apex of a pneumatic tire, an insert rubber of a run-flat tire, a fiber-reinforced rubber (FRR) for improving steering stability, cap treads, side walls, clinches, breaker cushions, jointless bands, etc. for various vehicle applications such as for passenger cars, trucks, buses, heavy vehicles, etc.

The invention claimed is:

1. A vulcanized rubber composition comprising:
   a rubber component composed of at least any one of a natural rubber, a modified natural rubber, acrylonitrile-butadiene rubber and polybutadiene rubber; and
   chemically modified microfibril cellulose.

2. The vulcanized rubber composition according to claim 1, wherein said chemically modified microfibril cellulose has been chemically modified to have a substitution degree within the range of 0.2 to 2.5.

3. The vulcanized rubber composition according to claim 1, wherein said chemically modified microfibril cellulose has an average fiber diameter within the range of 4 nm to 1 μm.

4. The vulcanized rubber composition according to claim 1, wherein the content of said chemically modified microfibril cellulose is within the range of 1 to 50 parts by mass relative to 100 parts by mass of said rubber component.

5. The vulcanized rubber composition according to claim 1, wherein said rubber component is composed of at least either said natural rubber or said modified natural rubber.

6. The vulcanized rubber composition according to claim 1, wherein the chemical modification in said chemically modified microfibril cellulose is at least one selected from the group consisting of acetylation, alkyl esterification, complex esterification, β-ketoesterification, alkyl carbamatation and aryl carbamatation.

7. The vulcanized rubber composition according to claim 6, wherein said chemically modified microfibril cellulose has been chemically modified to have a substitution degree within the range of 0.2 to 2.5.

8. The vulcanized rubber composition according to claim 7, wherein said chemically modified microfibril cellulose has an average fiber diameter within the range of 4 nm to 1 μm.

9. The vulcanized rubber composition according to claim 8, wherein the content of said chemically modified microfibril cellulose is within the range of 1 to 50 parts by mass relative to 100 parts by mass of said rubber component.

10. A pneumatic tire produced by using the vulcanized rubber composition according to claim 1.

11. A method for producing a vulcanized rubber composition, the method comprising:
    mixing, with a rubber latex containing at least one rubber component selected from a natural rubber, a modified natural rubber, acrylonitrile-butadiene rubber and polybutadiene rubber, 1 to 50 parts by mass, relative to 100 parts by mass of said rubber component, of chemically modified microfibril cellulose, followed by drying to prepare a masterbatch.

12. The method for producing a vulcanized rubber composition according to claim 11, wherein said mixing is a mixing method using a high-speed disperser.

13. The method for producing a vulcanized rubber composition according to claim 11, wherein said drying is a drying method of any one of drying in a heating oven, air drying, and pulse drying.

14. The method for producing a vulcanized rubber composition according to claim 11, wherein the chemical modification in said chemically modified microfibril cellulose is at least one selected from the group consisting of acetylation, alkyl esterification, complex esterification, β-ketoesterification, alkyl carbamatation and aryl carbamatation.

15. The method for producing a vulcanized rubber composition according to claim 11, wherein said chemically modified microfibril cellulose has been chemically modified to have a substitution degree within the range of 0.2 to 2.5.

16. The method for producing a vulcanized rubber composition according to claim 11, wherein said chemically modified microfibril cellulose has an average fiber diameter within the range of 4 nm to 1 μm.

17. A method of producing a pneumatic tire, including the steps of:
   kneading a compounding agent to a masterbatch prepared in the method of producing a vulcanized rubber composition according to claim 11;
   adding a vulcanizing agent and a vulcanization accelerator and kneading; and
   vulcanizing the mixture under an application of pressure and heating in a tire mold.

* * * * *